No. 783,958. Patented February 28, 1905.

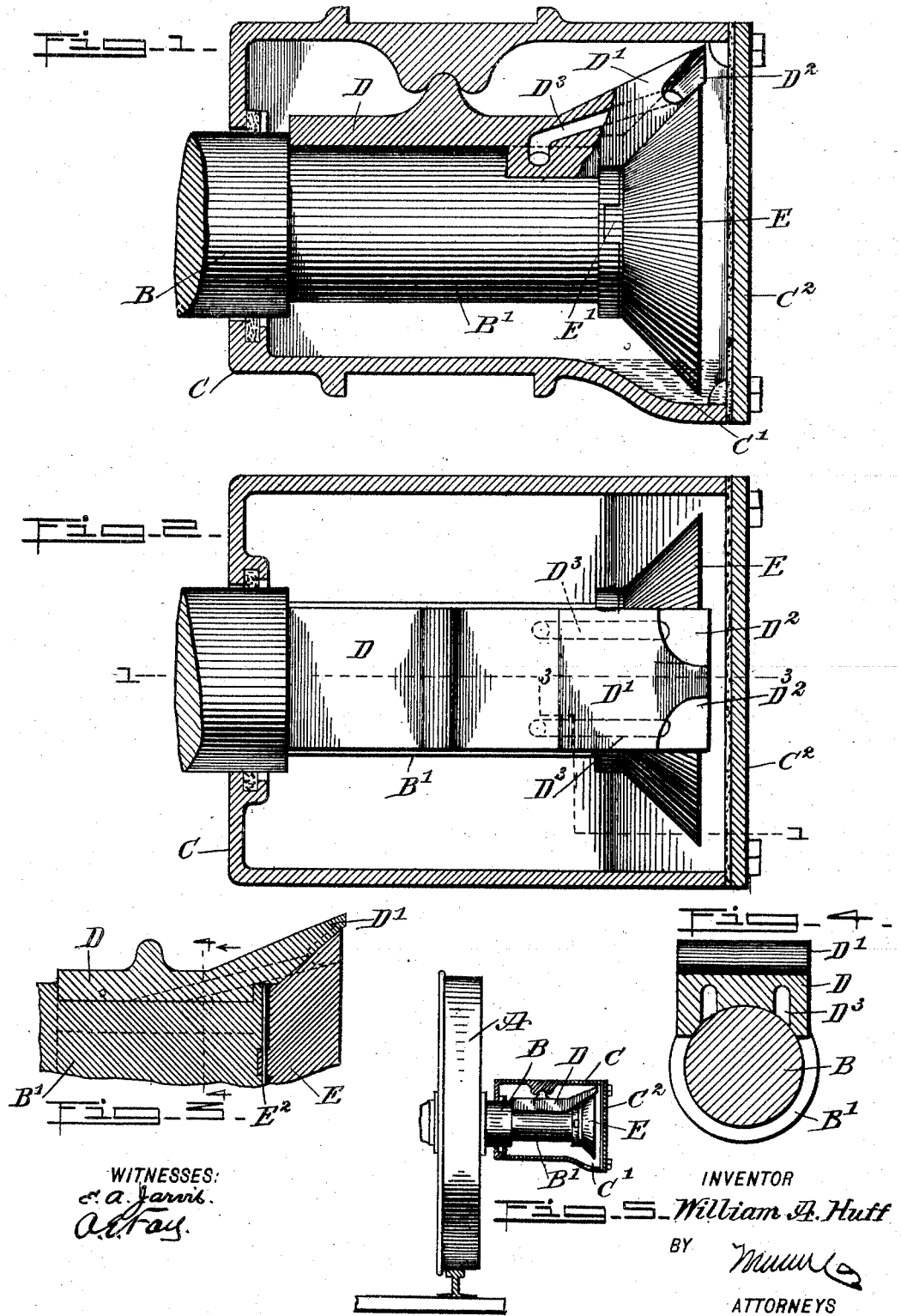

UNITED STATES PATENT OFFICE.

WILLIAM A. HUFF, OF NEW YORK, N. Y.

OILING DEVICE.

SPECIFICATION forming part of Letters Patent No. 783,958, dated February 28, 1905.

Application filed June 6, 1904. Serial No. 211,302.

*To all whom it may concern:*

Be it known that I, WILLIAM A. HUFF, a citizen of the United States, and a resident of the city of New York, borough of Manhattan, in the county and State of New York, have invented a new and Improved Oiling Device, of which the following is a full, clear, and exact description.

My invention relates to a device for oiling bearings, and while it is especially applicable to the oiling of car-axle bearings it is capable of use upon any other kind of a bearing.

The object of my invention is to provide for a ready and continuous flow of oil from a pool of oil to a bearing. For this purpose I make use of centrifugal force in a manner which will be described.

Reference is to be had to the accompanying drawings, forming a part of this specification, in which similar characters of reference indicate corresponding parts in all the figures.

Figure 1 is a longitudinal vertical sectional view of a box with the end of a shaft or axle therein on the line 1 1 of Fig. 2. Fig. 2 is a horizontal sectional view of the same. Fig. 3 is a fragmentary sectional view on the line 3 3 of Fig. 2, showing a slight modification. Fig. 4 is a sectional view on the line 4 4 of Fig. 3; and Fig. 5 is a view, on a smaller scale, showing a car-wheel and the end of an axle therefor and also the parts shown in Fig. 1.

Although I have illustrated in the drawings a particular embodiment of my invention, which is especially adapted for use on car-axles without roller-bearings, it will be obvious that the invention is capable of general use and may be employed with all other kinds of bearings, including roller and ball bearings.

In the drawings I have shown a car-wheel A, provided with an axle B, having a journal B', and located in a box C, having a depression C', adapted to be filled with oil to form an oil-pool, and a cover $C^2$, which is adapted to be firmly secured to the end of the box.

D is a bearing, which is provided with an upward extension D', constituting a collector, which may be of any desired shape and is preferably provided with a mouth $D^2$ on each side and having a thin lower edge. From these mouths extend passages $D^3$, which may be parallel or at an angle to each other and preferably pass back into the body of the bearing D and out upon the surface of the shaft at opposite sides thereof, as indicated in Fig. 4. The lower side of the extension D' is shaped to approximately fit the surface of a device E for supplying oil. This device is shown in the drawings as a conical projection on the shaft B, and it may be either solid, as indicated, or hollow, and also may be formed in many other shapes—as, for instance, in the form of a disk—without departing from the spirit of my invention. This projection or cone is provided with one or more projections E' and is secured to the end of the shaft by means of pins $E^2$ or in any desired manner, so that it cannot turn with respect to the shaft.

The operation of a device constructed upon the principle herein illustrated will be as follows: Upon the rotation of the shaft the cone or disk E, the lower edge of which is located in the pool C', will upon rotating throw the oil by centrifugal force to its outside edge. The oil being more or less thick and consistent will tend to remain on the surface of the disk and be carried around it, although if the speed is great enough some of it will be thrown from the edge of the disk against the side and top of the box.

Although I have illustrated in Fig. 5 a certain relative difference between the diameters of the wheel A and the cone E, it will be obvious that the latter will be made of whatever size is necessary in order to prevent too much of the oil from being thrown from its surface upon the rotation of the shaft and at the same time secure the proper lifting of the oil upon its surface as it rotates. When designed in this way, the oil will naturally form a ring upon the edge of the cone or disk, and the thin lower edge of the mouth $D^2$ will operate to scoop up the oil, and the latter will necessarily fill the opening formed in the edge of the extension D' and flow down the passage $D^3$ onto the bearing-surface. This passage $D^3$ may be bent, as shown in Fig. 1 of the drawings, or it may be straight or curved, according to the necessities of the case. A straight passage would be cheaper, and consequently preferable in many cases. The latter form is shown in Fig. 3 of the drawings.

If desired, the mouth D² may be made to extend to any distance down the lower edge of the extension D', this being a mere matter of design to be determined upon in the construction of the device of any particular size or dimension.

It will thus be seen that an apparatus constructed upon this principle, whether following the exact embodiment of it illustrated in the drawings or not, will supply oil to the bearings constantly while the shaft is rotating in either direction, and, further, that when the shaft is stationary there will be a well of oil in one of the passages D³ under some head and that this oil will remain there and be in proper condition for lubricating the bearing when the shaft is started. The top of the extension D' forms a protection for the oil in the passages, and it is intended to prevent the entrance of dust and dirt; but it will be obvious that the passages B³ could be open at the top as well as closed and that in this case any superfluous oil would flow over the top of the bearing D instead of down the face of the cone, as would be the case in the form illustrated in the drawings.

Having thus described my invention, I claim as new and desire to secure by Letters Patent—

1. A lubricating device comprising a rotatable element having a bearing-surface, a centrifugal oil-delivering means, and a bearing having an extension provided with two mouths for collecting oil, said mouths having thin edges adjacent to said oil-delivering means and passages from said mouths to said bearing-surface.

2. A lubricating device comprising a shaft or axle, an oil-delivering means, and a bearing having an extension provided with two oil-collecting mouths having thin edges and two parallel passages from said mouths, the ends of said passages being located on opposite sides of the shaft.

3. A lubricating device for a shaft or axle, comprising a cone mounted on the shaft or axle, and a stationary collector located thereabove, said collector having oil-conveying passages and a lower surface conforming to the shape of the adjacent surface of the cone, and having a mouth on each side, each of said mouths being provided with a thin inclined lower edge extending along the surface of the cone to collect oil therefrom.

4. In a lubricating device, the combination with a shaft or axle, of a truncated cone secured to the end thereof and presenting a continuous conical surface from the immediate vicinity of the end of the shaft to the edge of the base of the cone, and a collector mounted above the shaft and in proximity to the surface of the cone, said collector being provided with oil-conveying passages and a lower surface conforming to the adjacent conical surface and having a mouth on each side communicating with said oil-conveying passages, each mouth being provided with a thin inclined lower edge extending along the surface of the cone.

5. In a lubricating device, the combination with a shaft or axle, of a truncated cone secured to the end thereof and presenting a continuous conical surface from the immediate vicinity of the end of the shaft to the edge of the base of the cone, and a collector mounted above the shaft or axle and in proximity to the surface of the cone, said collector having means for conveying oil from the surface of the cone to the shaft or axle.

In testimony whereof I have signed my name to this specification in the presence of two subscribing witnesses.

WILLIAM A. HUFF.

Witnesses:
   JNO. M. RITTER,
   ALBERT E. FAY.